United States Patent
Tsirkin et al.

(10) Patent No.: US 11,586,454 B2
(45) Date of Patent: Feb. 21, 2023

(54) SELECTIVE MEMORY DEDUPLICATION FOR VIRTUAL MACHINES

(71) Applicant: Red Hat, Inc., Raleigh, NC (US)

(72) Inventors: Michael Tsirkin, Lexington, MA (US); Andrea Arcangeli, Imola (IT)

(73) Assignee: Red Hat, Inc., Raleigh, NC (US)

( * ) Notice: Subject to any disclaimer, the term of this patent is extended or adjusted under 35 U.S.C. 154(b) by 153 days.

(21) Appl. No.: 16/730,263

(22) Filed: Dec. 30, 2019

(65) Prior Publication Data
US 2021/0200567 A1 Jul. 1, 2021

(51) Int. Cl.
*G06F 9/455* (2018.01)
*G06F 12/02* (2006.01)
*G06F 12/1009* (2016.01)

(52) U.S. Cl.
CPC ...... *G06F 9/45545* (2013.01); *G06F 9/45558* (2013.01); *G06F 12/0246* (2013.01); *G06F 12/1009* (2013.01); *G06F 2009/45583* (2013.01)

(58) Field of Classification Search
CPC ............. G06F 9/45545; G06F 9/45558; G06F 12/0246; G06F 12/1009; G06F 2009/45583
See application file for complete search history.

(56) References Cited

U.S. PATENT DOCUMENTS

| | | | |
|---|---|---|---|
| 9,575,681 B1* | 2/2017 | Fisher | G06F 3/0641 |
| 2012/0167082 A1* | 6/2012 | Kumar | G06F 9/45558 718/1 |
| 2014/0068612 A1* | 3/2014 | Torrey | G06F 21/60 718/1 |
| 2017/0147240 A1* | 5/2017 | Tsirkin | G06F 9/45558 |
| 2017/0364263 A1* | 12/2017 | Lublin | G06F 3/0608 |
| 2019/0370049 A1* | 12/2019 | Gopalan | G06F 9/45558 |
| 2020/0174923 A1* | 6/2020 | Bhattiprolu | G06F 13/1668 |

OTHER PUBLICATIONS

Skarlatos, D. et al. (Oct. 14-18, 2017). "PageForge: A Near-Memory Content-Aware Page-Merging Architecture", University of Illinois at Urbana-Champaign. 13 pages.
Oliverio, M. et al. (Oct. 28, 2017). "Secure Page Fusion with VUsion: https://www.vusec.net/projects/VUsion", 16 pages.

* cited by examiner

*Primary Examiner* — Emerson C Puente
*Assistant Examiner* — Jonathan R Labud
(74) *Attorney, Agent, or Firm* — Lowenstein Sandler LLP

(57) ABSTRACT

A guest operating system (OS) of a virtual machine (VM) receives a first request from an application to enable memory deduplication for a memory page associated with the application, identifies a mergeable memory range for memory space of the guest OS, where the mergeable memory rage is associated with guest OS memory pages to be deduplicated, and maps, in a page table of the guest OS, a page table entry for the memory page to a memory address within the mergeable memory range. The guest OS causes a hypervisor to enable deduplication for the memory page responsive to detecting an access of the memory page by the application.

18 Claims, 6 Drawing Sheets

SELECTIVE MEMORY DEDUPLICATION FOR VIRTUAL MACHINES

TECHNICAL FIELD

The present disclosure is generally related to computer systems, and more particularly, to selective memory deduplication for virtualized computer systems.

BACKGROUND

A virtual machine (VM) is an emulation of a computer system. When executed on appropriate hardware, a VM creates an environment allowing the virtualization of an actual physical computer system (e.g., a server, a mainframe computer, etc.). The actual physical computer system is typically referred to as a "host machine." Typically, a component on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system" or "guest OS." In some implementations, the guest OS and applications executing within the guest OS can be collectively referred to as the "guest."

Virtualized computer systems can use a technology referred to as "memory deduplication" that allows memory pages that include identical information to be "merged" by the hypervisor. This process can map a single physical memory page (a "mergeable" memory page) to be mapped to multiple virtual addresses managed by the hypervisor.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
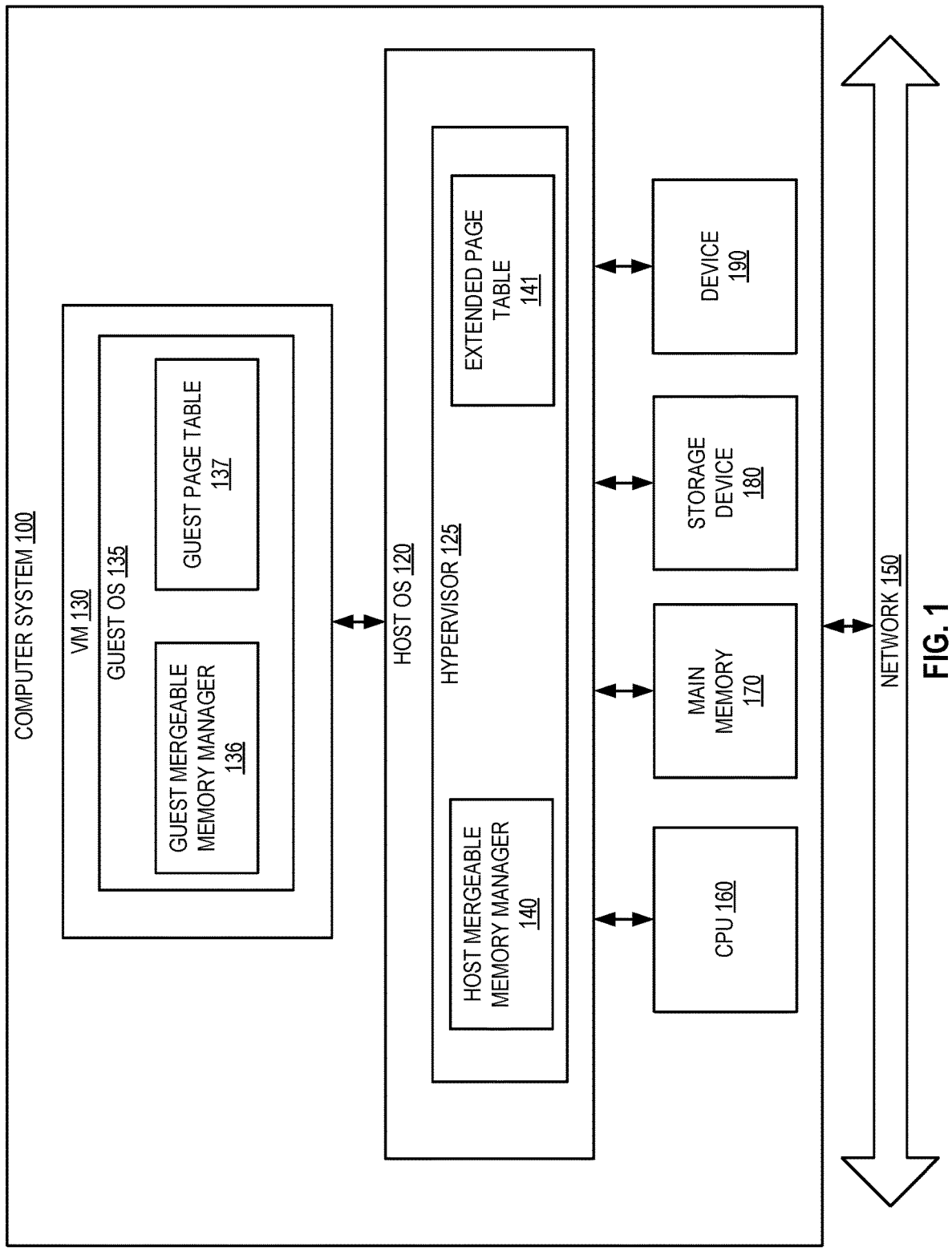
FIG. 1 depicts a high-level component diagram of an example computer system architecture, in accordance with one or more aspects of the present disclosure.

Described herein are methods and systems for selective memory deduplication in virtualized computer systems. Memory deduplication can reduce the overall amount of memory used in a shared system, which can result it performance improvements and resource efficiency. Memory deduplication, however can lead to security vulnerabilities. For example, when memory is deduplicated, the physical memory at the host level may be the same between potentially multiple VMs, or within the same VM, between different processes which may belong to different users. Each VM can contain different containers with different users, which presents the possibility that one user may be able to access sensitive data owned by another.

Enabling deduplication for a VM, however, can expose the system to security vulnerabilities referred to as "side-channel attacks", which are attacks based on computer system weaknesses rather than software flaws. For example, a cache attack is a type of side-channel attack that is based on an attacker's ability to monitor cache accesses made by a user in a shared system such as a virtualized computer environment or cloud service. Enabling deduplication results in different processes sharing the same memory. Once this occurs, an attacker can read the shared memory and infer what is in the memory and how it is being used by another user. The result can be a side-channel attack where to VMs can communicate through the side-channel since the portion of memory is the same.

Some conventional systems attempt to mitigate security related issues by permitting deduplication by virtual address. For example, Linux provides this functionality via the "madvise(MADV_MERGEABLE)" system call. This method, however, may not be effective when executing Linux within a VM, since the hypervisor is typically responsible for deduplication across the host. Thus, conventional systems may typically either enable deduplication at the hypervisor level if the applicable processes are deemed to not include sensitive data. If those processes have strict data security requirements, conventional systems typically disable deduplication to eliminate the risk of side-channel vulnerabilities.

Aspects of the present disclosure address the above noted and other deficiencies by implementing a guest mergeable memory manager and host mergeable memory manager to facilitate selective memory deduplication for virtual machines. The guest mergeable memory manager can provide the ability for an application executing within a VM to selectively determine whether or not to enable deduplication for a particular memory page (e.g., whether to make that page mergeable). The physical memory of the VM (e.g., the guest physical memory) can be configured with a mergeable memory range and a non-mergeable memory range. A memory page to be deduplicated can be assigned a guest physical address in the mergeable memory range, while memory pages that are not to be deduplicated can be assigned a guest physical address in the non-mergeable memory range. The host mergeable memory manager can perform deduplication operations on those memory pages that are within the mergeable memory range.

Aspects of the present disclosure present advantages over conventional solutions to the issues noted above. First, the mergeable memory managers of the present disclosure can provide applications with the ability to determine which memory pages to make mergeable. Deduplication can be enabled across a system while not forcing every process within the system to expose its data to security vulnerabilities. Thus, the resource efficiencies inherent to deduplication can be preserved while at the same time significantly reducing exposure to side-channel type security vulnerabilities. Additionally, since resource efficiency can be improved in systems with strict data security requirements, overall performance (particularly with respect to memory use) can be dramatically improved.

FIG. 1 is a block diagram of a computer system 100 in which implementations of the disclosure may operate. Although implementations of the disclosure are described in accordance with a certain type of system, this should not be considered as limiting the scope or usefulness of the features of the disclosure.

As shown in FIG. 1, the computer system 100 is connected to a network 150 and comprises one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, main memory 170 may be non-uniform access (NUMA), such that memory access time depends on the memory location relative to CPU 160. The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet). It should be noted that although, for simplicity, a single CPU 160, storage device 180, and device 190 are depicted in FIG. 1, other implementations of computer system 100 may comprise a plurality of CPUs, storage devices, and devices.

Computer system 100 may additionally include a virtual machine (VM) 130. VM 130 may be an application environment that executes programs as though it was an actual physical machine. VM 130 may comprise a guest operating system (OS) 135 that can handle the execution of applications (not pictured) within the VM. It should be noted that although, for simplicity, a single VM 130 is depicted in FIG. 1, computer system 100 may host a plurality of VMs 130.

In some implementations, guest OS 135 can additionally include a guest mergeable memory manager 136 to facilitate selective memory deduplication for VM 130. Guest mergeable memory manager 136 can be invoked by an application executing within guest OS 135 (not pictured) to enable the application to selectively determine whether or not to designate memory used by that application as eligible for deduplication by hypervisor 125. For example, should an application determine that a portion of its memory does not include sensitive information, and therefore may be mergeable with other memory pages, the application can invoke guest mergeable memory manager 136 to enable memory deduplication for that memory page. Guest mergeable memory manager 136 can be invoked by an application by an API call, an OS system call, or the like. For example, in the Linux operating system, guest mergeable memory manager 136 can be invoked by executing the "madvise(MADV_MERGEABLE)" command.

Once a request has been received from an application to enable memory deduplication for a memory page associated with the application, guest mergeable memory manager 136 can identify a mergeable memory range for memory space of guest OS 135. In various implementations, the memory space of guest OS 135 can be configured to include a non-mergeable memory range and a mergeable memory range. The non-mergeable memory range can represent a range of guest physical memory addresses that are associated with memory pages that are not to be deduplicated (e.g., are "non-mergeable"). The mergeable memory range can represent a range of guest physical memory addresses that are associated with memory pages that are to be deduplicated (e.g., are "mergeable").

In some implementations, the memory space of the guest OS 135 can be configured such that the mergeable memory range includes a range of guest physical addresses (GPAs) that are significantly higher than those of the non-mergeable memory range. For example, for a guest OS with 1 Gigabyte (Gb) of physical memory, the memory space may be configured such that the non-mergeable memory range can be up to 1 Gb, while the mergeable memory space may be configured to be at addresses of 1 Terabyte+1 Gb. In such instances, the mergeable memory range can be represented by setting the highest order bit in the memory address. Accordingly, the GPA for a mergeable page can be assigned by setting the highest order bit for an address in the non-mergeable range. For example, a memory page can be mapped at non-mergeable GPA 0x0abcd0000 and its mergeable address can be calculated by setting the highest bit for that address (e.g., 0x1abcd0000).

Thus, memory pages to be deduplicated can be mapped to GPAs in the mergeable memory range, and memory pages that are not to be deduplicated can be mapped to GPAs in the non-mergeable memory range. In some implementations, the configuration of the memory ranges can be determined by hypervisor 125 and sent to guest OS 135 during the initialization of VM 130. Alternatively, the configuration of the memory ranges can be obtained by OS 135 from configuration parameters provided to VM 130 during startup.

Once the mergeable memory range has been identified, guest mergeable memory manager 136 can map, in guest page table entry 137, a page table entry for the memory page to a memory address within the mergeable memory range. As noted above, guest mergeable memory manager 136 can set the high order bit for the GPA of the memory page such that the resulting GPA (e.g., the "mergeable GPA") is within the mergeable memory range. Subsequently, when the application attempts to access the memory page, guest mergeable memory manager 136 can be invoked to determine whether the memory page is within the mergeable memory range. If so, guest mergeable memory manager 136 can send a notification to hypervisor 125 to enable deduplication for the memory page.

In some implementations, guest mergeable memory manager 136 can be subsequently invoked by the application to disable deduplication for a memory page. For example, in the Linux operating system, guest mergeable memory manager 136 can be invoked by executing the "madvise(MADV_UNMERGEABLE)" command. In such instances, guest mergeable memory manager 136 can identify the non-mergeable memory space of guest OS 135 and modify the entry for the page in guest page table 137 to map to a GPA in the non-mergeable memory range. In an illustrative example, guest mergeable memory manager 136 can reset the high order bit for the GPA of the page such that the resulting GPA (e.g., the "non-mergeable GPA) is within the non-mergeable memory range. Subsequently, when the application attempts to access the memory page, guest mergeable memory manager 136 can be invoked to determine whether the memory page is within the mergeable memory range. If not (e.g., the page table entry now points to a non-mergeable GPA), guest mergeable memory manager 136 can send a notification to hypervisor 125 to disable deduplication for the memory page.

Guest mergeable memory manager 136 is described in further detail below with respect to FIG. 2.

Computer system 100 may also include a host operating system (OS) 120, which may comprise software, hardware, or both, that manages the hardware resources of the computer system and that provides functions such as inter-process communication, scheduling, virtual memory management, and so forth. In some examples, host operating system 120 also includes a hypervisor 125, which provides a virtual operating platform for virtual machine (VM) 130 and that manages its execution. It should be noted that in some other examples, hypervisor 125 may be external to host OS 120, rather than embedded within host OS 120.

Hypervisor 125 can include host mergeable memory manager 140 to operate in conjunction with guest mergeable memory manager 136 for facilitating selective memory deduplication. In various implementations, host mergeable memory manager 140 can be invoked to map host physical memory to the corresponding guest physical memory in extended page table 141. In an illustrative example, host mergeable memory manager 140 can receive a notification from guest OS 135 (e.g., from guest mergeable memory manager 136) that indicates that an application has accessed a memory page. In some implementations, guest mergeable memory manager 136 can send a notification message to host mergeable memory manager 140. Alternatively, when the application attempts to access the memory page, if the memory page is not associated with an entry in extended page table 141, a virtual machine exit (e.g., VM exit) can be issued to transfer control to host mergeable memory manager 140.

Host mergeable memory manager 140 can then determine whether or not the memory page is associated with the mergeable memory range for the memory space of guest OS 135. If so (e.g., the memory page has been made mergeable by the application), host mergeable memory manager 140 can map, in extended page table 141, an extended page table (EPT) entry for the memory page to the mergeable GPA for the memory page. Once the EPT entry has been created, host mergeable memory manager 140 can provide access to the memory page for the application. In some implementations, subsequent attempts by the application to access the mergeable GPA memory page can be handled by hypervisor 140 without invoking host mergeable memory manager 140 since the EPT entry has been created in extended page table 141.

Host mergeable memory manager 140 can then perform a memory deduplication operation for the memory page in view of the EPT entries for memory pages within the mergeable memory range. As noted above, the mergeable GPA for a memory page to be deduplicated can have a high bit set such that the GPA is within the configured mergeable memory range. Host mergeable memory manger 140 can thus perform deduplication by analyzing the EPT entries in extended page table 141 to identify those pages with the high bit set (e.g., those memory pages in the mergeable memory range). Any memory page with a mergeable GPA can be considered eligible for deduplication. In various embodiments, host mergeable memory manager 140 can perform the deduplication process directly. Alternatively, host mergeable memory manager 140 can invoke another component of hypervisor 125 to perform the deduplication operation. For example, in a Linux operating system, host mergeable memory manager 140 can invoke a kernel same-page merging (KSM) process to perform the deduplication operation to analyze extended page table 141 for entries associated with mergeable GPAs.

Host mergeable memory manager 140 is described in further detail below with respect to FIG. 3.

Figure 2:
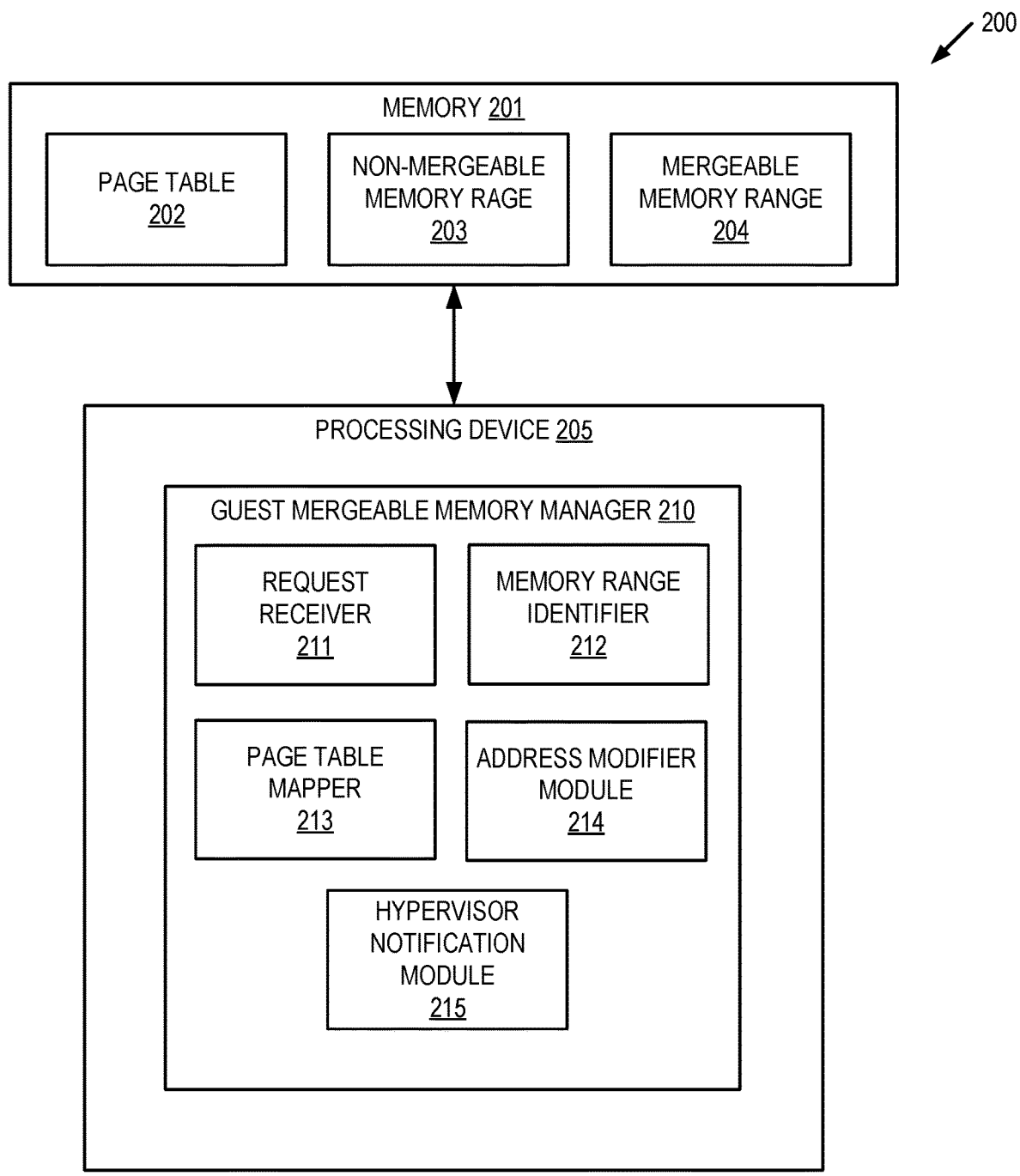
FIG. 2 depicts a block diagram illustrating an example of a guest mergeable memory manager to facilitate selective memory deduplication, in accordance with one or more aspects of the present disclosure.

FIG. 2 depicts a block diagram illustrating an example of a guest mergeable memory manager 210 for facilitating selective memory deduplication. In some implementations, guest mergeable memory manager 210 may correspond to guest mergeable memory manager 136 of FIG. 1. As shown in FIG. 2, guest mergeable memory manager 210 may be a component of a computing apparatus 200 that includes a processing device 205, operatively coupled to a memory 201, to execute guest mergeable memory manager 210. In some implementations, processing device 205 and memory 201 may correspond to processing device 602 and main memory 604 respectively as described below with respect to FIG. 6.

Guest mergeable memory manager 210 may include request receiver 211, memory range identifier 212, page table mapper 213, address modifier module 214, and hypervisor notification module 215. Alternatively, the functionality of one or more of request receiver 211, memory range identifier 212, page table mapper 213, address modifier module 214, and hypervisor notification module 215 may be combined into a single module or divided into multiple sub-modules.

Request receiver 211 is responsible for receiving a request from an application to enable memory deduplication for a memory page associated with the application. Request receiver 211 can be invoked by an application via an API call, an OS system call, or the like. As noted above, in some implementations, the request may be received responsive to the application executing a command to enable deduplication for the memory page (e.g., executing the Linux madvise (MADV_MERGEABLE) command). In some implementations, request receiver 211 can be invoked during startup of the guest OS when the associated VM initializes to enable deduplication by default for some or all memory pages of the VM without application intervention.

Memory range identifier 212 is responsible for identifying a mergeable memory range for memory space of the guest OS. As noted above, the memory space of guest OS (e.g., memory 201) can be configured to include a non-mergeable memory range (e.g., non-mergeable memory range 203) and a mergeable memory range (e.g., mergeable memory range 204). Non-mergeable memory range 203 can represent a range of guest physical memory addresses that are associated with memory pages that are not to be deduplicated (e.g., are "non-mergeable"). Mergeable memory range 204 can represent a range of guest physical memory addresses that are associated with memory pages that are to be deduplicated (e.g., are "mergeable").

As noted above, the memory space 201 can be configured such that mergeable memory range 204 includes a range of guest physical addresses (GPAs) that are significantly higher than those of non-mergeable memory range 203. In such instances, mergeable memory range 204 can be represented by setting the highest order bit in the physical memory address. Accordingly, the GPA for a mergeable page can be assigned by setting the highest order bit for the address of the page in the non-mergeable range. For example, a memory page can be mapped to non-mergeable memory range 203 by resetting the high order bit of the address, producing a non-mergeable GPA of 0x0abcd0000 (high order bit reset to '0'). Upon receiving a request from an application to enable memory deduplication for that page, the memory page can be mapped to mergeable memory range 204 by setting the high order bit of the address, producing a mergeable GPA of 0x1abcd0000 (high order bit set to '1').

In some implementations, the configuration of the memory ranges can be determined by a hypervisor and sent to a guest OS during the initialization of a VM. Alternatively, the configuration of the memory ranges can be obtained by guest mergeable memory manager 210 from configuration parameters provided to a VM during startup.

Page table mapper 213 is responsible for mapping, in a page table of the guest OS, a page table entry for the memory page to a memory address within the mergeable memory range (e.g., mergeable memory range 204). As noted above, page table mapper 213 can set the high order bit for the GPA of the memory page such that the resulting GPA (e.g., the "mergeable GPA") is within mergeable memory range 204. To do so, page table mapper 213 can first determine a GVA associated with the memory page. Page table mapper 213 can then determine a GPA associated with the GVA. If the memory page had been previously allocated, page table mapper 213 may determine the GPA by accessing page table 202 using the GVA. If, on the other hand, the memory page has not yet been allocated, page table mapper 213 can obtain a new GPA for the new page. In some implementations, page table mapper 213 can then invoke address modifier 214 to generate the mergeable GPA using the non-mergeable GPA. Subsequently, page table mapper 213 can store the mergeable GPA in a page table entry of page table 202 for the memory page associated with the corresponding GVA.

Address modifier module 214 is responsible for modifying the GPA of a memory page to generate a mergeable GPA that is associated with a memory address within mergeable memory range 204. In some implementations, address modifier 214 can modify the GPA by identifying a portion of the GPA associated with a memory address in mergeable memory range 204 (e.g., the high order bit of the memory address) and setting a value for that portion of the GPA to generate the mergeable GPA (e.g., setting the high order bit to '1').

Subsequently, request receiver 211 can receive a request from the application to access the memory page. As noted above, when a memory page has been made mergeable (e.g., when the application enables deduplication for the page), the GPA is modified to an address within mergeable memory range 204. While the mergeable GPA may have been added to page table 202, the host may not have the updated information stored in the host extended page table (EPT) until a subsequent attempt to access the page by the application. In such instances, request receiver 211 can be invoked to receive the subsequent request to access the memory page to determine whether the memory page is in mergeable memory range 204. If so, request receiver 211 can invoke hypervisor notification module 214 to enable deduplication for the memory page.

Hypervisor notification module 215 is responsible for causing the hypervisor to enable deduplication for the memory page responsive to detecting an access of the memory page by the application. In some implementations, a VM exit is generated when the mergeable GPA in page table 202 does not have a corresponding entry in the EPT maintained by the hypervisor. The hypervisor, after detecting the VM exit caused by the application access to the memory page, can store an entry in its EPT that associates the mergeable GPA with a host physical address for the memory page in memory space accessible to the hypervisor. The hypervisor can subsequently perform a deduplication operation for the memory page in view of additional EPT entries for other guest OS memory pages within the mergeable memory range. In some implementations, hypervisor notification module 215 may communicate with a corresponding hypervisor mergeable memory manager as described below with respect to FIG. 3.

In some implementations, guest mergeable memory manager 210 may be subsequently invoked to disable deduplication for a memory page. For example, in the Linux operating system, guest mergeable memory manager 136 can be invoked by executing the "madvise(MADV_UNMERGEABLE)" command. In such instances, request receiver 211 can receive a request from an application to disable memory deduplication for the memory page. Memory range identifier 212 can then be invoked to identify a non-mergeable memory range for the memory space of the guest OS (e.g., non-mergeable memory range 203 of memory 201). As noted above non-mergeable memory range 203 is associated with guest OS memory pages that are not to be deduplicated.

Subsequently, page table mapper 213 can be invoked to map the page table entry for the memory page to a memory address within non-mergeable memory range 203. As noted above, page table mapper 213 can reset the high order bit for the GPA of the memory page such that the resulting GPA (e.g., the "non-mergeable GPA") is within non-mergeable memory range 203. To do so, page table mapper 213 can first determine a GVA associated with the memory page. Page table mapper 213 can then determine a GPA associated with the GVA. If the memory page had been previously allocated, page table mapper 213 may determine the GPA by accessing page table 202 using the GVA. In some implementations, page table mapper 213 can then invoke address modifier 214 to generate the non-mergeable GPA using the mergeable GPA in page table 202.

Address modifier module 214 can modify the GPA by identifying a portion of the GPA associated with a memory address in non-mergeable memory range 204 (e.g., the high order bit of the memory address) and resetting a value for that portion of the GPA to generate the non-mergeable GPA (e.g., setting the high order bit to '0'). Subsequently, page table mapper 213 can store the non-mergeable GPA in the page table entry of page table 202 for the memory page associated with the corresponding GVA.

Subsequently, request receiver 211 can receive a request from the application to access the memory page. Once the memory page has been switched from mergeable to non-mergeable (e.g., when the application disables deduplication for the page), the GPA is modified to an address within non-mergeable memory range 204. However, the host may not have the updated information stored in the host extended page table (EPT) until a subsequent attempt to access the page by the application. In such instances, request receiver 211 can be invoked to receive the subsequent request to access the memory page to determine whether the memory page is in non-mergeable memory range 203. If so, a VM exit can be generated to cause the hypervisor to disable deduplication for the memory page in a manner similar to that noted above.

Figure 3:
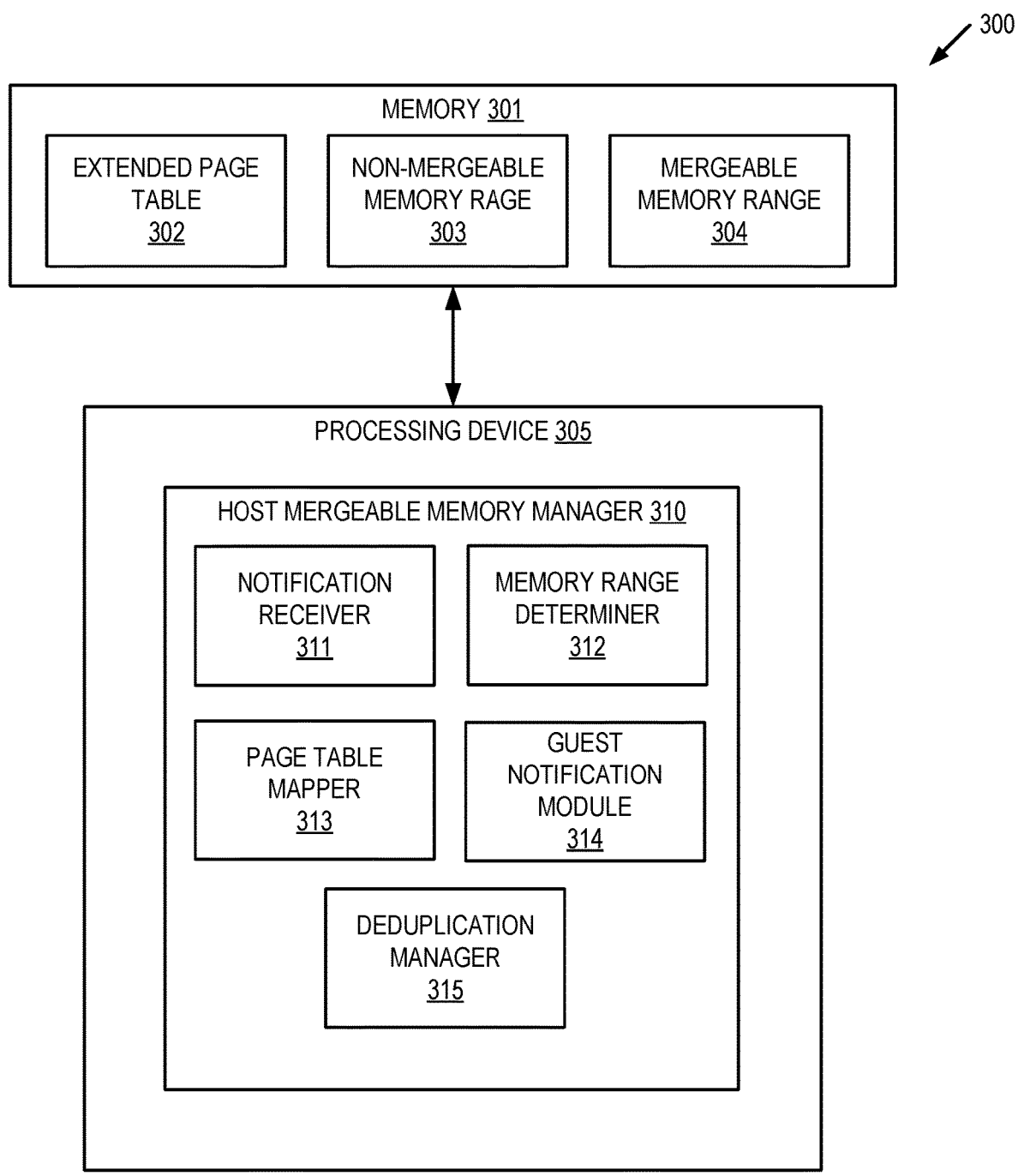
FIG. 3 depicts a block diagram illustrating an example of a host mergeable memory manager to facilitate selective memory deduplication, in accordance with one or more aspects of the present disclosure.

FIG. 3 depicts a block diagram illustrating an example of a host mergeable memory manager 310 for facilitating selective memory deduplication. In some implementations, host mergeable memory manager 310 may correspond to host mergeable memory manager 140 of FIG. 1. As shown in FIG. 3, host mergeable memory manager 310 may be a component of a computing apparatus 300 that includes a processing device 305, operatively coupled to a memory 301, to execute host mergeable memory manager 310. In some implementations, processing device 305 and memory 301 may correspond to processing device 602 and main memory 604 respectively as described below with respect to FIG. 6.

Host mergeable memory manager 310 may include notification receiver 311, memory range determiner 312, page table mapper 313, guest notification module 314, and deduplication manager 315. Alternatively, the functionality of one or more of notification receiver 311, memory range determiner 312, page table mapper 313, guest notification module 314, and deduplication manager 315 may be combined into a single module or divided into multiple submodules.

Notification receiver 311 is responsible for receiving a notification from a guest OS of a VM that indicates an application access of a memory page. In various implementations, the notification can be received from a guest mergeable memory manager (or component thereof) as described above with respect to FIG. 2. In one example, the guest mergeable memory manager can send a notification message the hypervisor that is received by notification receiver 311. Alternatively, when the application attempts to access the memory page, if the memory page is not associated with an entry in the extended page table of the hypervisor (e.g., extended page table 302), a virtual machine exit (e.g., VM exit) can be issued to transfer control to host mergeable memory manager 310. In such instances, notification receiver 311 can detect the VM exit issued by the application access of the memory page.

Memory range determiner 312 is responsible for determining whether the memory page is associated with a mergeable memory range for memory space of the guest OS (e.g., mergeable memory range 304). As noted above, mergeable memory range 304 can be associated with guest OS memory pages to be deduplicated and non-mergeable memory range 303 can be associated with guest OS memory pages that are not to be deduplicated. Memory range determiner 312 can make the determination in view of startup parameters used by the hypervisor when selected memory deduplication has been enabled for the hypervisor. In some implementations, the hypervisor can be configured to identify specific memory address ranges associated with non-mergeable memory range 303 and mergeable memory range 304. In such instances, host mergeable memory manager 310 can communicate the selected memory ranges to a guest OS by invoking guest notification module 314. Alternatively, the selected memory ranges can be stored in configuration files that can be used by a VM during startup to set the default memory ranges for the associated guest OS.

Page table mapper 313 is responsible for mapping, in an extended page table (EPT) of the hypervisor (e.g., EPT 302), an EPT entry for the memory page. If memory range determiner 312 determines that the information received by notification receiver 311 indicates that an application has requested that a memory page be made mergeable, page table mapper 313 can generate an EPT entry in EPT 302 that maps the memory page to a memory address within mergeable memory range 304. The resulting EPT entry can indicate that the associated memory page is to be deduplicated.

In some implementations, page table mapper 313 can create the EPT entry by determining the guest physical address (GPA) associated with the memory page that is to be made mergeable. This determination can be made by using information received by notification receiver 311. As noted above, when an application attempts to access a memory page that does not have a corresponding EPT entry in EPT 302, a VM exit can be generated to notify host mergeable memory manager 310. The VM exit can provide, among other information, the GPA of the applicable memory page. In the case of a memory page that has been made mergeable by the application, the "mergeable GPA" can be provided to host mergeable memory manager 310. As noted above, the GPA can include a high order bit that, when set, can indicate that the GPA is a mergeable GPA (e.g., is within the mergeable memory range 304).

Page table mapper 313 can determine whether the GPA is associated with a memory address within mergeable memory range 304 or non-mergeable memory range 303. In some implementations, page table mapper 313 can make this determination by first identifying a portion of the GPA that is associated with the range of memory addresses for mergeable memory range 304 (e.g., the high order bit of the GPA). Subsequently, page table mapper 313 can determine whether the identified portion of the memory address (e.g., the high order bit) is set to a value indicating that the address is within mergeable memory range 304 (e.g., if the high order bit is set to '1'). If so, the received GPA is a "mergeable GPA" and the associated memory page is to be deduplicated. Page table mapper 313 can then store the GPA in an EPT entry of EPT 302 that associates the mergeable GPA with a corresponding host physical address of the memory page in hypervisor memory.

In some implementations, where an application has requested that a pre-existing non-mergeable memory page be updated so that it is now mergeable, page table mapper 313 can update EPT 302 to add the new mergeable GPA and remove any associated non-mergeable GPA. Page table mapper 313 can check EPT 302 to identify any pre-existing EPT entries for a non-mergeable GPA that match the mergeable GPA except for the high order bit value. If there is a non-mergeable GPA in EPT 302 that matches the newly received mergeable GPA (indicating that the memory page was previously non-mergeable and the application has requested that it now be mergeable), the non-mergeable GPA can then be deleted from EPT 302 to indicate that the GPA is no longer non-mergeable.

If a host memory page had not been previously allocated for the requested memory page, host mergeable memory manager 310 can allocate the memory page and generate a new EPT entry for the new memory page. In either instance guest notification module 314 can be subsequently invoked to provide access to the memory page for the application. Guest notification module 314 can send a direct notification to the guest mergeable memory manager 310, which can subsequently return control to the application. Alternatively, guest notification module 314 can indicate to the hypervisor that control should be returned to the guest OS.

Deduplication manager 315 is responsible for performing a memory deduplication operation for the memory page in view of additional EPT entries for corresponding additional guest OS memory pages within the mergeable memory range 304. In some implementations, the memory deduplication operation can be performed with respect to a single VM (e.g., the memory pages for a single VM can be deduplicated within the VM). Alternatively, the memory deduplication operation can be performed across all VMs managed by the hypervisor. In some instances, the memory deduplication operation can be performed across all VMs as well as any other process managed by the hypervisor.

In some implementations, the memory deduplication operation can be performed by scanning EPT 302 to identify a subset of EPT entries associated with memory pages within mergeable memory 304. For example, deduplication manager 315 can scan EPT 302 to identify any EPT entry that has the high order bit set to indicate a mergeable GPA. Deduplication manager can then perform the memory deduplication operation using the identified subset of EPT entries.

In various implementations, the above steps can be performed to change a memory page from mergeable to non-mergeable using similar techniques. Notification receiver 311 can receive a notification that indicates a mergeable GPA is to be made non-mergeable. In such instances, the notification can include a non-mergeable GPA. Memory range determiner 312 can be invoked to identify the non-mergeable memory range, and page table mapper 313 can be invoked to generate a new EPT entry for the non-mergeable GPA as well as remove any entry associated with a mergeable GPA for the memory page. Page table mapper 313 can identify an associated mergeable GPA by identifying a GPA in EPT 302 that matches the received non-mergeable GPA but that also has the high order bit set. Once the non-mergeable GPA has been removed from EPT 302, the associated memory page should be excluded from any subsequent deduplication operations.

Figure 4:
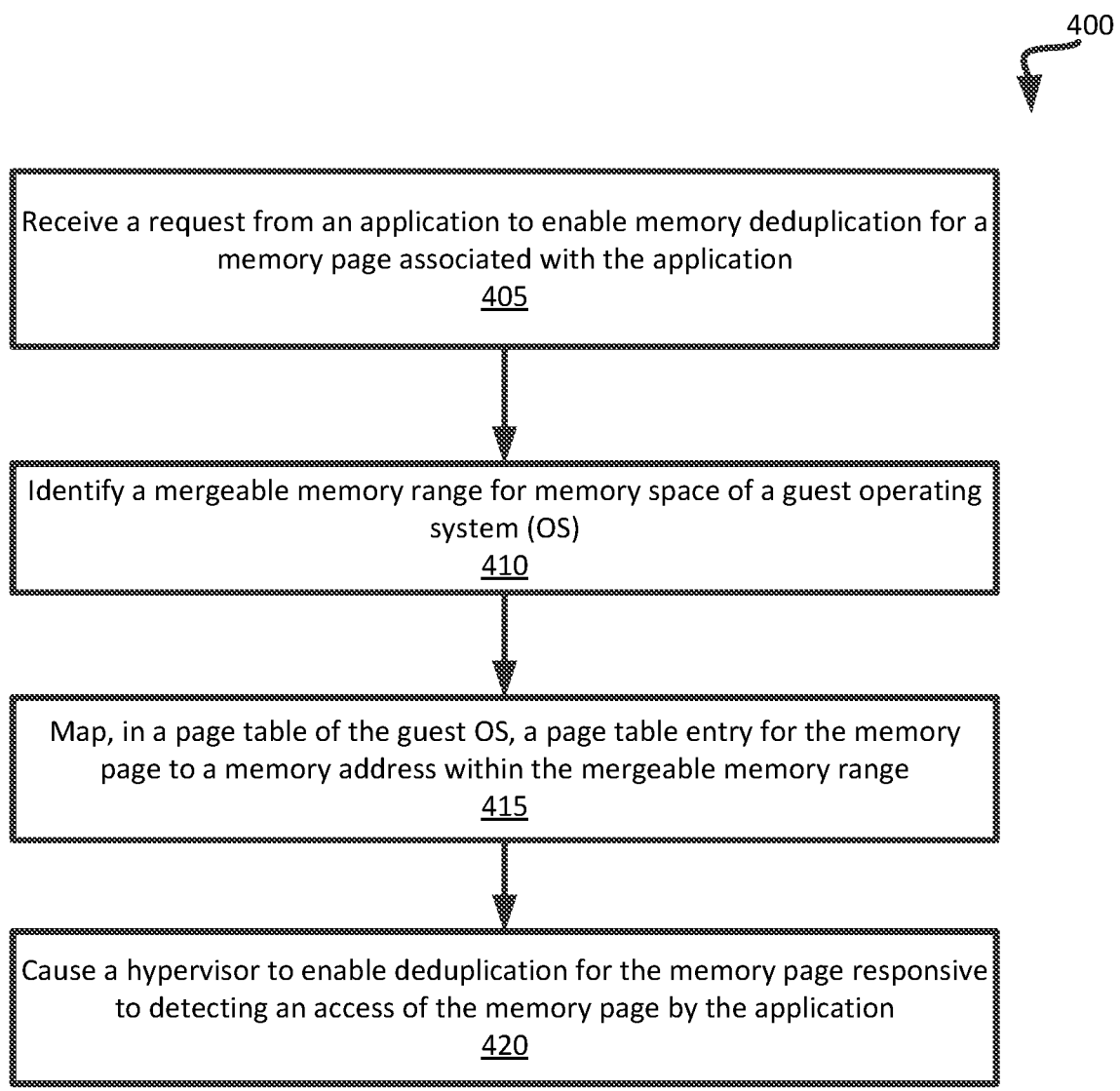
FIG. 4 depicts a flow diagram of a method for facilitating selective memory deduplication by a guest operating system, in accordance with one or more aspects of the present disclosure.

FIG. 4 depicts a flow diagram of an example method 400 for facilitating selective memory deduplication by a guest operating system. The method may be performed by processing logic that may comprise hardware (circuitry, dedicated logic, etc.), computer readable instructions (run on a general purpose computer system or a dedicated machine), or a combination of both. In an illustrative example, method 400 may be performed by guest mergeable memory manager 136 in FIG. 1, or guest mergeable memory manager 210 in FIG. 2. Alternatively, some or all of method 300 might be performed by another module or machine. It should be noted that blocks depicted in FIG. 4 could be performed simultaneously or in a different order than that depicted.

At block 405, processing logic receives a request from an application to enable memory deduplication for a memory page associated with the application. At block 410, processing logic identifies a mergeable memory range for memory space of a guest operating system (OS), where the mergeable memory range is associated with guest OS memory pages to be deduplicated. At block 415, processing logic maps, in a page table of the guest OS, a page table entry for the memory page to a memory address within the mergeable memory range. At block 420, processing logic causes a hypervisor to enable deduplication for the memory page responsive to detecting an access of the memory page by the application.

Figure 5:
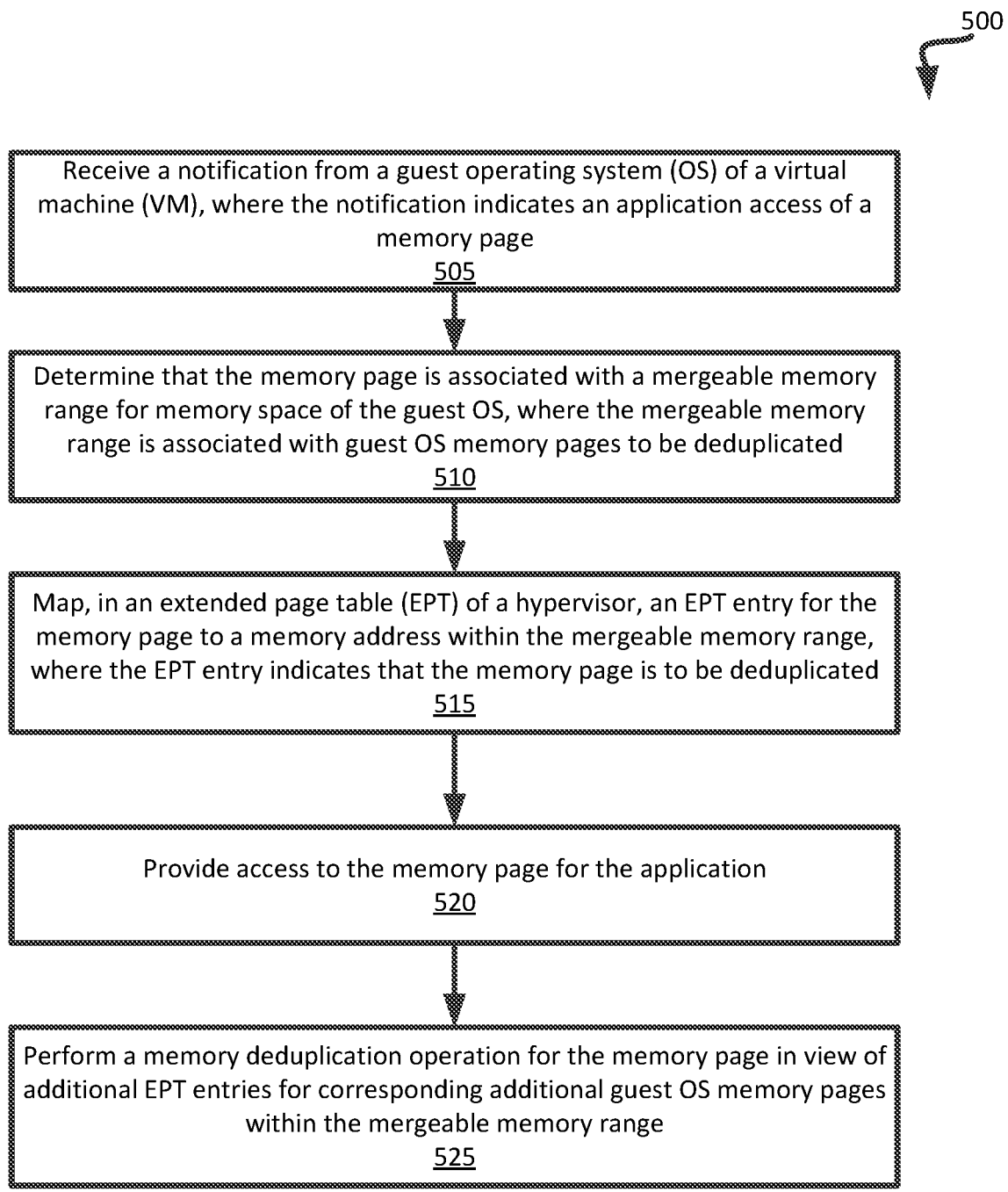
FIG. 5 depicts a flow diagram of a method for facilitating selective memory deduplication by a host, in accordance with one or more aspects of the present disclosure.

FIG. 5 depicts a flow diagram of an example method 500 for facilitating selective memory deduplication by a host. The method may be performed by processing logic that may comprise hardware (circuitry, dedicated logic, etc.), computer readable instructions (run on a general purpose computer system or a dedicated machine), or a combination of both. In an illustrative example, method 500 may be performed by host mergeable memory manager 140 in FIG. 1, or host mergeable memory manager 310 in FIG. 3. Alternatively, some or all of method 300 might be performed by another module or machine. It should be noted that blocks depicted in FIG. 5 could be performed simultaneously or in a different order than that depicted.

At block 505, processing logic receives a notification from a guest operating system (OS) of a virtual machine (VM), where the notification indicates an application access of a memory page. At block 510, processing logic determines that the memory page is associated with a mergeable memory range for memory space of the guest OS, where the mergeable memory range is associated with guest OS memory pages to be deduplicated. At block 515, processing logic maps, in an extended page table (EPT) of a hypervisor, an EPT entry for the memory page to a memory address within the mergeable memory range, where the EPT entry indicates that the memory page is to be deduplicated. At block 520, processing logic provides access to the memory page for the application. At block 525, processing logic performs a memory deduplication operation for the memory page in view of additional EPT entries for corresponding additional guest OS memory pages within the mergeable memory range.

Figure 6:
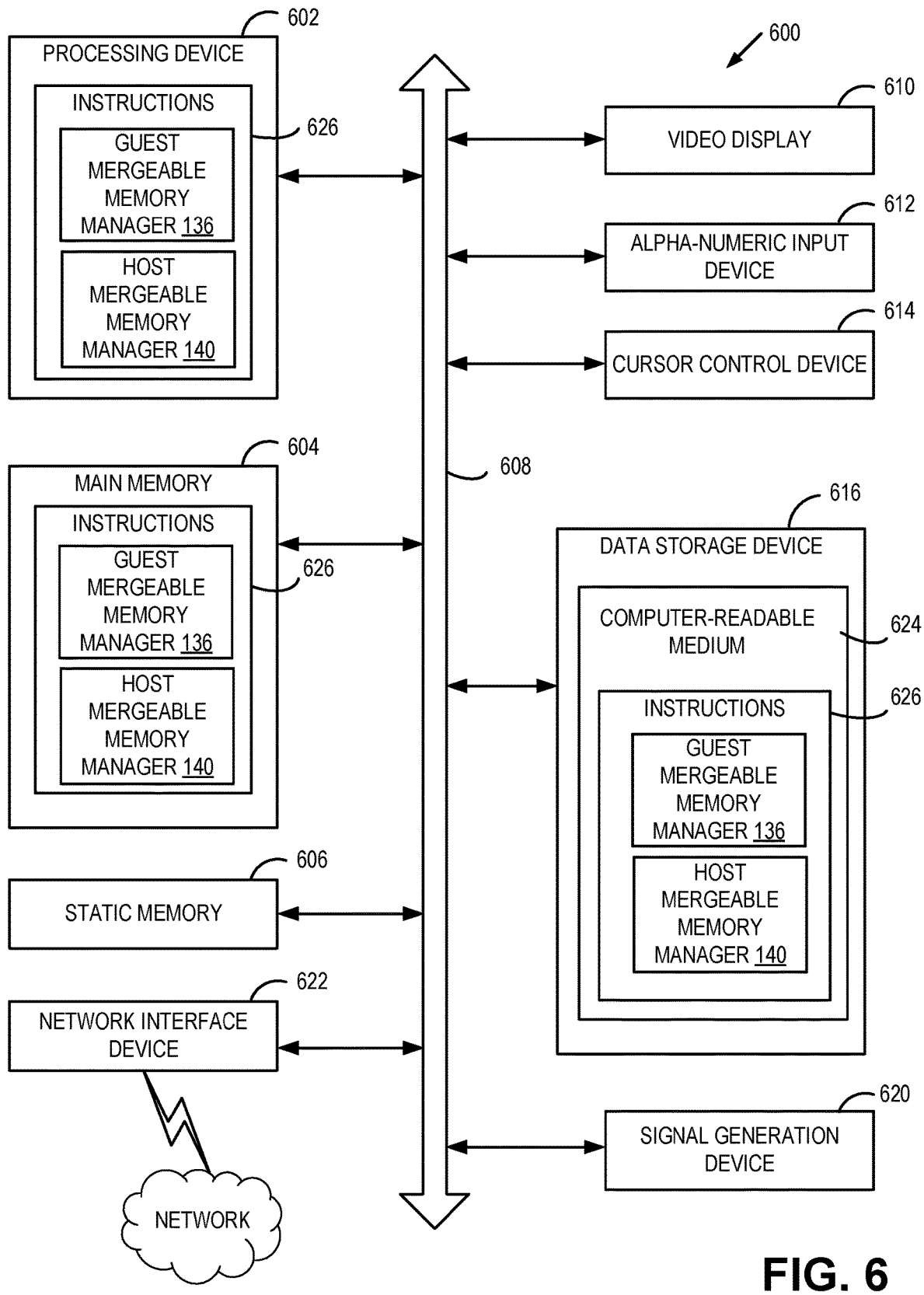
FIG. 6 depicts a block diagram of an illustrative computer system operating in accordance with one or more aspects of the present disclosure.

FIG. 6 depicts an example computer system 600 which can perform any one or more of the methods described herein. In one example, computer system 600 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic (e.g., instructions 626) that includes guest mergeable memory manager 125 and/or host mergeable memory manager 140 for performing the operations and steps discussed herein (e.g., corresponding to the method of FIGS. 4-5, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a non-transitory computer-readable medium 624 on which may store instructions 626 that include guest mergeable memory manager 125 and/or host mergeable memory manager 140 (e.g., corresponding to the method of FIGS. 4-5, etc.) embodying any one or more of the methodologies or functions described herein. Guest mergeable memory manager 125 and/or host mergeable memory manager 140 may also reside, completely or at least partially, within the main memory 604 and/or within the processing device 602 during execution thereof by the computer system 600, the main memory 604 and the processing device 602 also constituting computer-readable media. Guest mergeable memory manager 125 and/or host mergeable memory manager 140 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "identifying," "mapping," "receiving," "sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

Other computer system designs and configurations may also be suitable to implement the system and methods described herein. The following examples illustrate various implementations in accordance with one or more aspects of the present disclosure.

Example 1 is a method comprising receiving, by a processing device executing a guest operating system (OS) of a virtual machine (VM), a first request from an application to enable memory deduplication for a memory page associated with the application; identifying a mergeable memory range for memory space of the guest OS, wherein the mergeable memory rage is associated with guest OS memory pages to be deduplicated; mapping, in a page table of the guest OS, a page table entry for the memory page to a memory address within the mergeable memory range; and causing a hypervisor to enable deduplication for the memory page responsive to detecting an access of the memory page by the application.

Example 2 is the method of Example 1, further comprising receiving, from the hypervisor, information indicating the range of memory addresses for the mergeable memory range.

Example 3 is the method of Example 1, further comprising determining a guest virtual address (GVA) associated with the memory page; determining a guest physical address (GPA) associated with the GVA; modifying the GPA to generate a mergeable GPA associated with the memory address within the mergeable memory range; and storing the mergeable GPA in the page table entry for the memory page.

Example 4 is the method of Example 3, further comprising identifying a portion of the GPA associated with the range of memory addresses for the mergeable memory range; and setting a value for the portion of the GPA to generate the mergeable GPA.

Example 5 is the method of Example 4, further comprising receiving a second request from the application to disable memory deduplication for the memory page; identifying a non-mergeable memory range for the memory space of the guest OS, wherein the non-mergeable memory rage is associated with guest OS memory pages not to be deduplicated; mapping, in the page table of the guest OS, the page table entry for the memory page to a second memory address within the non-mergeable memory range; and causing a hypervisor to disable deduplication for the memory page responsive to detecting another access of the memory page by the application.

Example 6 is the method of Example 5, further comprising determining the GVA associated with the memory page; determining the GPA associated with the GVA; responsive to determining that the GPA is associated with the mergeable memory range, modifying the GPA to generate a non-mergeable GPA associated with the second memory address within the non-mergeable memory range; and storing the non-mergeable GPA in the page table entry for the memory page.

Example 7 is the method of Example 6, further comprising identifying the portion of the GPA associated with the range of memory addresses for the non-mergeable memory range; and resetting the value for the portion of the GPA to generate the non-mergeable GPA.

Example 8 is the method of Example 1, wherein the hypervisor is to: detect the access of the memory page by the application; determine that the page table entry for the memory page maps to the memory address within the mergeable memory range; store, in an extended page table (EPT) of the hypervisor, an EPT entry for the memory page that associates the mergeable GPA with a host physical address for the memory page in a hypervisor memory space; and perform a memory deduplication operation for the memory page in view of additional EPT entries for corresponding additional guest OS memory pages within the mergeable range.

Example 9 is a system comprising a memory, and a processing device, operatively coupled to the memory, to execute a guest operating system (OS) of a virtual machine (VM) to: receive a first indication from an application to enable memory deduplication for a memory page associated with the application; identify a mergeable memory range for memory space of the guest OS, wherein the mergeable memory rage is associated with guest OS memory pages to be deduplicated; map, in a page table of the guest OS, a page table entry for the memory page to a memory address within the mergeable memory range; receive a second indication from the application to access the memory page; and responsive to determining that the page table entry for the memory page maps to the memory address within the mergeable memory range, provide a notification to a hypervisor to cause the hypervisor to enable deduplication for the memory page.

Example 10 is the system of Example 9, wherein the processing device is further to: receive, from the hypervisor, information indicating the range of memory addresses for the mergeable memory range.

Example 11 is the system of Example 9, wherein the processing device is further to: determine a guest virtual address (GVA) associated with the memory page; determine a guest physical address (GPA) associated with the GVA; modify the GPA to generate a mergeable GPA associated with the memory address within the mergeable memory range; and store the mergeable GPA in the page table entry for the memory page.

Example 12 is the system of Example 11, wherein the processing device is further to: identify a portion of the GPA associated with the range of memory addresses for the mergeable memory range; and set a value for the portion of the GPA to generate the mergeable GPA.

Example 13 is the system of Example 12, wherein the processing device is further to: receive a third indication from the application to disable memory deduplication for the memory page; identify a non-mergeable memory range for the memory space of the guest OS, wherein the non-mergeable memory rage is associated with guest OS memory pages not to be deduplicated; map, in the page table of the guest OS, the page table entry for the memory page to a second memory address within the non-mergeable memory range; receive a fourth indication from the application to access the memory page; and responsive to determining that the page table entry for the memory page maps to the second memory address within the non-mergeable memory range, provide a second notification to the hypervisor to cause the hypervisor to disable deduplication for the memory page.

Example 14 is the system of Example 13, wherein the processing device is further to: determine the GVA associated with the memory page; determine the GPA associated with the GVA; responsive to determining that the GPA is associated with the mergeable memory range, modify the GPA to generate a non-mergeable GPA associated with the second memory address within the non-mergeable memory range; and store the non-mergeable GPA in the page table entry for the memory page.

Example 15 is the system of Example 14, wherein the processing device is further to: identify the portion of the GPA associated with the range of memory addresses for the non-mergeable memory range; and reset the value for the portion of the GPA to generate the non-mergeable GPA.

Example 16 is the system of Example 9, wherein the processing device is further to: receive the notification to enable deduplication for the memory page; store, in an extended page table (EPT) of the hypervisor, an EPT entry for the memory page that associates the mergeable GPA with a host physical address for the memory page in a hypervisor memory space; and perform a memory deduplication operation for the memory page in view of additional EPT entries for corresponding additional guest OS memory pages within the mergeable range.

Example 17 is a non-transitory computer readable medium comprising instructions, which when accessed by a processing device, cause the processing device to: receive, by a guest operating system (OS) of a virtual machine (VM), a first indication from an application to enable memory deduplication for a memory page associated with the application; identify a mergeable memory range for memory space of the guest OS, wherein the mergeable memory rage is associated with guest OS memory pages to be deduplicated; map, in a page table of the guest OS, a page table entry for the memory page to a memory address within the mergeable memory range; and cause a hypervisor to enable deduplication for the memory page responsive to detecting an access of the memory page by the application.

Example 18 is the non-transitory computer readable medium of Example 17, wherein the processing device is further to: receive a second indication from the application to disable memory deduplication for the memory page; identify a non-mergeable memory range for the memory space of the guest OS, wherein the non-mergeable memory rage is associated with guest OS memory pages not to be deduplicated; map, in the page table of the guest OS, the page table entry for the memory page to a second memory address within the non-mergeable memory range; and cause a hypervisor to disable deduplication for the memory page responsive to detecting another access of the memory page by the application.

Example 19 is the non-transitory computer readable medium of Example 17, wherein the processing device is further to: receive, from the hypervisor, information indicating the range of memory addresses for the mergeable memory range.

Example 20 is the non-transitory computer readable medium of Example 17, wherein the processing device is further to: detect the access of the memory page by the application; store, in an extended page table (EPT) of the hypervisor, an EPT entry for the memory page that associates the mergeable GPA with a host physical address for the memory page in a hypervisor memory space; and perform a memory deduplication operation for the memory page in view of additional EPT entries for corresponding additional guest OS memory pages within the mergeable range.

Example 21 is a method comprising: receiving, by a processing device executing a hypervisor, a notification from a guest operating system (OS) of a virtual machine (VM), wherein the notification indicates an application access of a memory page; determining that the memory page is associated with a mergeable memory range for memory space of the guest OS, wherein the mergeable memory range is associated with guest OS memory pages to be deduplicated; mapping, by the processing device, in an extended page table (EPT) of the hypervisor, an EPT entry for the memory page to a memory address within the mergeable memory range, wherein the EPT entry indicates that the memory page is to be deduplicated; providing access to the memory page for the application; and performing a memory deduplication operation for the memory page in view of additional EPT entries for corresponding additional guest OS memory pages within the mergeable memory range.

Example 22 is the method of Example 21, further comprising: detecting a VM exit issued by the guest OS, wherein the VM exit indicates the application access of the memory page.

Example 23 is the method of Example 21, further comprising: determining a guest physical address (GPA) associated with the memory page; determining that the GPA is associated with a memory address within the mergeable memory range; and storing the GPA in the EPT entry.

Example 24 is the method of Example 21, further comprising: identifying a portion of the GPA associated with the range of memory addresses for the mergeable memory range; and determining that the portion of the GPA is set to a value indicating an address within the mergeable memory range.

Example 25 is the method of Example 21, further comprising: responsive to determining that the memory page is not present in hypervisor memory, allocating the memory page.

Example 26 is the method of Example 21, wherein performing the memory deduplication operation comprises: scanning the EPT to identify a subset of EPT entries associated with corresponding additional memory pages within the mergeable memory range; and performing the memory deduplication operation in view of the subset of EPT entries.

Example 27 is a system comprising a memory, and a processing device, operatively coupled to the memory, to execute a hypervisor to: receive a notification from a guest operating system (OS) of a virtual machine (VM), wherein the notification indicates an application access of a memory page; determine that the memory page is associated with a mergeable memory range for memory space of the guest OS, wherein the mergeable memory range is associated with guest OS memory pages to be deduplicated; map, in an extended page table (EPT) of the hypervisor, an EPT entry for the memory page to a memory address within the mergeable memory range, wherein the EPT entry indicates that the memory page is to be deduplicated; provide access to the memory page for the application; and perform a memory deduplication operation for the memory page in view of additional EPT entries for corresponding additional guest OS memory pages within the mergeable memory range.

Example 28 is the system of Example 27, wherein the processing device is further to: detect a VM exit issued by the guest OS, wherein the VM exit indicates the application access of the memory page.

Example 29 is the system of Example 27, wherein the processing device is further to: determine a guest physical address (GPA) associated with the memory page; determine that the GPA is associated with a memory address within the mergeable memory range; and store the GPA in the EPT entry.

Example 30 is the system of Example 27, wherein the processing device is further to: identify a portion of the GPA associated with the range of memory addresses for the mergeable memory range; and determine that the portion of the GPA is set to a value indicating an address within the mergeable memory range.

Example 31 is the system of Example 27, wherein the processing device is further to: responsive to determining that the memory page is not present in hypervisor memory, allocate the memory page.

Example 32 is the system of Example 27, wherein the processing device is further to: scan the EPT to identify a subset of EPT entries associated with corresponding additional memory pages within the mergeable memory range; and perform the memory deduplication operation in view of the subset of EPT entries.

Example 33 is a non-transitory computer readable medium comprising instructions, which when accessed by a processing device, cause the processing device to execute a hypervisor to: receive a notification from a guest operating system (OS) of a virtual machine (VM), wherein the notification indicates an application access of a memory page; determine that the memory page is associated with a mergeable memory range for memory space of the guest OS, wherein the mergeable memory range is associated with guest OS memory pages to be deduplicated; map, in an extended page table (EPT) of the hypervisor, an EPT entry for the memory page to a memory address within the mergeable memory range, wherein the EPT entry indicates that the memory page is to be deduplicated; provide access to the memory page for the application; and perform a memory deduplication operation for the memory page in view of additional EPT entries for corresponding additional guest OS memory pages within the mergeable memory range.

Example 34 is the non-transitory computer readable medium of Example 33, wherein the processing device is further to: detect a VM exit issued by the guest OS, wherein the VM exit indicates the application access of the memory page.

Example 35 is the non-transitory computer readable medium of Example 33, wherein the processing device is further to: determine a guest physical address (GPA) associated with the memory page; determine that the GPA is associated with a memory address within the mergeable memory range; and store the GPA in the EPT entry.

Example 36 is the non-transitory computer readable medium of Example 33, wherein the processing device is further to: identify a portion of the GPA associated with the range of memory addresses for the mergeable memory range; and determine that the portion of the GPA is set to a value indicating an address within the mergeable memory range.

Example 37 is the non-transitory computer readable medium of Example 33, wherein the processing device is further to: responsive to determining that the memory page is not present in hypervisor memory, allocate the memory page.

Example 38 is the non-transitory computer readable medium of Example 33, wherein the processing device is further to: scan the EPT to identify a subset of EPT entries associated with corresponding additional memory pages within the mergeable memory range; and perform the memory deduplication operation in view of the subset of EPT entries.

Example 39 is an apparatus comprising means for receiving, by a guest operating system (OS) of a virtual machine (VM), a first request from an application to enable memory deduplication for a memory page associated with the application; means for identifying a mergeable memory range for memory space of the guest OS, wherein the mergeable memory rage is associated with guest OS memory pages to be deduplicated; means for mapping, in a page table of the guest OS, a page table entry for the memory page to a memory address within the mergeable memory range; means for receiving a second request from the application to access the memory page; and means for sending a notification to a hypervisor to cause the hypervisor to enable deduplication for the memory page responsive to determining that the page table entry for the memory page maps to the memory address within the mergeable memory range.

What is claimed is:

1. A method comprising:
receiving, by a processing device executing a guest operating system (OS) of a virtual machine (VM), a first request from an application to enable memory deduplication for a memory page associated with the application;
determining a guest virtual address (GVA) associated with the memory page;
determining a portion of a guest physical address (GPA) associated with the GVA;
identifying, based on the portion of the GPA, a mergeable memory range for memory space of the guest OS, wherein the mergeable memory range is associated with guest OS memory pages to be deduplicated;
mapping, in a page table of the guest OS, a page table entry for the memory page to a memory address within the mergeable memory range;
modifying the portion of the GPA to generate a mergeable GPA associated with the memory address within the mergeable memory range;
storing the mergeable GPA in the page table entry for the memory page; and
causing a hypervisor to enable deduplication for the memory page responsive to detecting an access of the memory page by the application.

2. The method of claim 1, further comprising:
receiving, from the hypervisor, information indicating the range of memory addresses for the mergeable memory range.

3. The method of claim 1, further comprising:
identifying the portion of the GPA associated with the range of memory addresses for the mergeable memory range; and
setting a value for the portion of the GPA to generate the mergeable GPA.

4. The method of claim 1, further comprising:
receiving a second request from the application to disable memory deduplication for the memory page;
identifying a non-mergeable memory range for the memory space of the guest OS, wherein the non-mergeable memory range is associated with guest OS memory pages not to be deduplicated;
mapping, in the page table of the guest OS, the page table entry for the memory page to a second memory address within the non-mergeable memory range; and
causing the hypervisor to disable deduplication for the memory page responsive to detecting another access of the memory page by the application.

5. The method of claim 4, further comprising:
responsive to determining that the portion of the GPA is associated with the mergeable memory range, modifying the portion of the GPA to generate a non-mergeable GPA associated with the second memory address within the non-mergeable memory range; and
storing the non-mergeable GPA in the page table entry for the memory page.

6. The method of claim 5, further comprising:
identifying the portion of the GPA associated with the range of memory addresses for the non-mergeable memory range; and
resetting a value for the portion of the GPA to generate the non-mergeable GPA.

7. The method of claim 1, wherein the hypervisor is to:
detect the access of the memory page by the application;
determine that the page table entry for the memory page maps to the memory address within the mergeable memory range;

store, in an extended page table (EPT) of the hypervisor, an EPT entry for the memory page that associates the mergeable GPA with a host physical address for the memory page in a hypervisor memory space; and perform a memory deduplication operation for the memory page in view of additional EPT entries for corresponding additional guest OS memory pages within the mergeable range.

8. A system comprising:

a memory; and a processing device, operatively coupled to the memory, execute a hypervisor to:
  receive a notification from a guest operating system (OS) of a virtual machine (VM), wherein the notification indicates an application access of a memory page;
  determine a portion of a guest physical address (GPA) associated with the memory page;
  determine, based on the portion of the GPA, that the memory page is associated with a mergeable memory range for memory space of the guest OS, wherein the mergeable memory range is associated with guest OS memory pages to be deduplicated;
  map, in an extended page table (EPT) of the hypervisor, an EPT entry for the memory page to a memory address within the mergeable memory range, wherein the EPT entry indicates that the memory page is to be deduplicated;
  store the portion of the GPA in the EPT entry;
  provide access to the memory page for the application; and
  perform a memory deduplication operation for the memory page in view of additional EPT entries for corresponding additional guest OS memory pages within the mergeable memory range.

9. The system of claim 8, wherein the processing device is further to:
  detect a VM exit issued by the guest OS, wherein the VM exit indicates the application access of the memory page.

10. The system of claim 8, wherein the processing device is further to:
  determine that the portion of the GPA is associated with a memory address within the mergeable memory range.

11. The system of claim 10, wherein the processing device is further to:
  identify the portion of the GPA associated with the range of memory addresses for the mergeable memory range; and
  determine that the portion of the GPA is set to a value indicating an address within the mergeable memory range.

12. The system of claim 8, wherein the processing device is further to:
  responsive to determining that the memory page is not present in hypervisor memory, allocate the memory page.

13. The system of claim 12, wherein the processing device is further to:
  scan the EPT to identify a subset of EPT entries associated with corresponding additional memory pages within the mergeable memory range; and
  perform the memory deduplication operation in view of the subset of EPT entries.

14. A non-transitory computer readable medium comprising instructions, which when accessed by a processing device, cause the processing device to:
  receive, by a guest operating system (OS) of a virtual machine (VM), a first indication from an application to enable memory deduplication for a memory page associated with the application;
  determine a guest virtual address (GVA) associated with the memory page;
  determine a portion of a guest physical address (GPA) associated with the GVA;
  identify, based on the portion of the GPA, a mergeable memory range for memory space of the guest OS, wherein the mergeable memory range is associated with guest OS memory pages to be deduplicated;
  map, in a page table of the guest OS, a page table entry for the memory page to a memory address within the mergeable memory range;
  modify the portion of the GPA to generate a mergeable GPA associated with the memory address within the mergeable memory range;
  store the mergeable GPA in the page table entry for the memory page; and
  cause a hypervisor to enable deduplication for the memory page responsive to detecting an access of the memory page by the application.

15. The non-transitory computer readable medium of claim 14, wherein the processing device is further to:
  identify the portion of the GPA associated with the range of memory addresses for the mergeable memory range; and
  set a value for the portion of the GPA to generate the mergeable GPA.

16. The non-transitory computer readable medium of claim 14, wherein the processing device is further to:
  receive a second indication from the application to disable memory deduplication for the memory page;
  identify a non-mergeable memory range for the memory space of the guest OS, wherein the non-mergeable memory range is associated with guest OS memory pages not to be deduplicated;
  map, in the page table of the guest OS, the page table entry for the memory page to a second memory address within the non-mergeable memory range; and
  cause a hypervisor to disable deduplication for the memory page responsive to detecting another access of the memory page by the application.

17. The non-transitory computer readable medium of claim 14, wherein the processing device is further to:
  receive, from the hypervisor, information indicating the range of memory addresses for the mergeable memory range.

18. The non-transitory computer readable medium of claim 14, wherein the hypervisor is to:
  detect the access of the memory page by the application;
  store, in an extended page table (EPT) of the hypervisor, an EPT entry for the memory page that associates the mergeable GPA with a host physical address for the memory page in a hypervisor memory space; and
  perform a memory deduplication operation for the memory page in view of additional EPT entries for corresponding additional guest OS memory pages within the mergeable range.

* * * * *